No. 874,839.
PATENTED DEC. 24, 1907.
C. H. FOSTER.
PIPE WRENCH.
APPLICATION FILED MAR. 21, 1907.
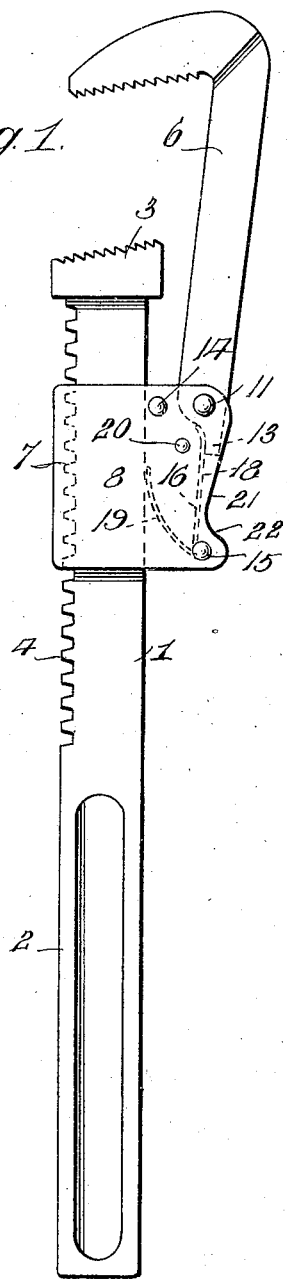
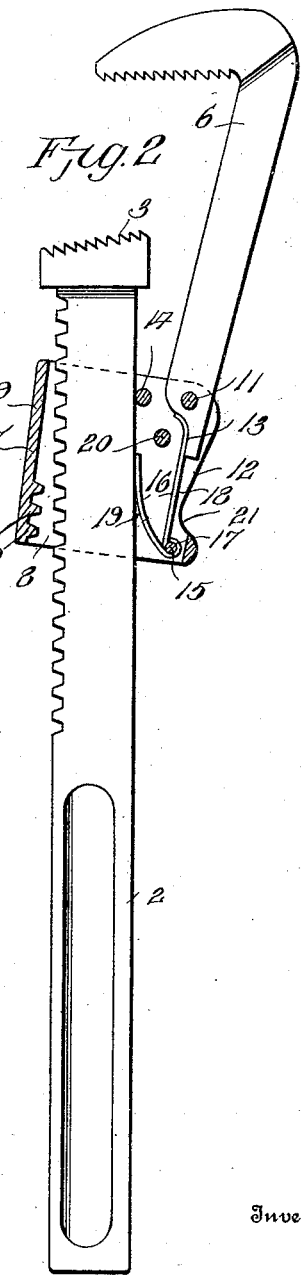
Witnesses
Frank Hough
C. C. Hines
Inventor
Charles H. Foster,
By Victor J. Evans
Attorney

UNITED STATES PATENT OFFICE.

CHARLES H. FOSTER, OF WEST DULUTH, MINNESOTA.

PIPE-WRENCH.

No. 874,839.

Specification of Letters Patent.

Patented Dec. 24, 1907.

Application filed March 21, 1907. Serial No. 363,696.

*To all whom it may concern:*

Be it known that I, CHARLES H. FOSTER, a citizen of the United States, residing at West Duluth, in the county of St. Louis and State of Minnesota, have invented new and useful Improvements in Pipe-Wrenches, of which the following is a specification.

This invention relates to pipe wrenches, its object being to provide a comparatively simple, strong, durable and inexpensive device of this character in which the movable jaw may be quickly adjusted for pipes of varying diameters, and wherein effective provision is made for locking the movable jaw in any desired position along the shank and throwing it out of engagement therewith for ready and rapid adjustment.

In the accompanying drawings,—Figure 1 is a side elevation of the wrench, with the head or sliding sleeve of the movable jaw locked in adjusted position. Fig. 2 is a view showing the parts in corresponding position with the head or sleeve tilted out of locking engagement for adjustment. Fig. 3 is a back view of the wrench.

Referring to the drawing, 1 designates the wrench shank provided at its rear end with a handle 2 and formed or provided at its forward end with a fixed jaw 3 and along one of its longitudinal edges with a series of rack teeth or notches 4.

A movable or swinging jaw 6 is provided for coöperation with the jaw 3, and is pivotally mounted at its rear end upon the upper front portion of a sliding head or sleeve 7 embracing the shank 1. The head or sleeve may be of any desired construction, but, as shown, comprises a pair of spaced side plates 8 connected at one side by a bridge wall 9 arranged adjacent the rack teeth 4 and provided at its rear end with a series of teeth 10 to interlock with the said teeth 4.

The sleeve is adapted to be thrown into and out of locking engagement with the shank by a tilting motion, and is provided with a cross pin 11 extending between the plates 8 to pivotally support the jaw, which pin 11 is located at the upper forward end of the sleeve, or on a diagonal line opposite the locking teeth 10, located at the lower rear end of the sleeve. Fig. 1 shows the normal position of the parts, from which it will be seen that when the head or sleeve lies at right angles to the shank the teeth 10 interlock with the teeth 4, and thus securely fix said sleeve from movement in either direction, thus maintaining the jaw 6 at a desired relative position to the jaw 3.

The upper portion of the head or sleeve 9 is slotted or left open, as indicated at 12, for the free movement of a lug or short arm 13 forming an extension from the stem of the movable jaw beyond the pivot 11, and arranged in line with the pin 11 and between the same and the rear or untoothed edge of the shank is a guide and stop pin 14 adapted to engage the shank to guide the sleeve in its movements, as well as to limit its tilting unlocking action.

A cross pin 15 extends between the plates 8 at the upper rear corner of the sleeve and supports a controlling spring 16. This spring consists of a strip of metal bent to form a coil 17 engaging the pin 15, a spring arm 18 engaging the lug 13 of the movable jaw and a spring arm 19 bearing against the rear edge of the shank. The arm 18 exerts pressure upon the lug 13 to hold the jaw 3 in normal gripping position and permit a limited outward movement thereof, which movement is restricted by a stop pin 20, while the spring arm 19 exerts reverse pressure to normally draw the sleeve to throw the locking teeth 10 into engagement with the rack teeth 4.

In operation, the jaw 6 has the usual pivotal movement for adjustment within a determined limit to coöperate with the jaw 3 in gripping a pipe or other object, the yielding movement of said jaw being restricted by the pin 20 lying in the path of movement of the lug 13 and spring arm 18. To adjust the movable jaw toward or away from the jaw 3, the head or sleeve 7 is tilted at a downward and rearward angle against the pressure of the spring arm 19, which movement will be limited by the stop pin 14, whereby the teeth 10 will be thrown out of engagement with teeth 4 and the sleeve adjusted to the position shown in Fig. 2, whereupon it may be conveniently slid along the shank on the pin 14 as a guide to adjust the movable jaw relatively to the fixed jaw as desired. When the sleeve is released, the spring 19 automatically restores it to normal position and locks it against movement. For convenience in tilting the sleeve the rear edges of the plates 8 are preferably cut away to form a finger recess 21 and a bearing shoulder 22, thus providing for its free manipulation.

It will be observed that by mounting the spring upon the upper rear corner of the sliding and tilting sleeve and arranging the spring arms 18 and 19 to diverge throughout their length, a large extent of pivotal movement of the sleeve is permitted. It will further be observed that lug 13 is formed by cutting away the lower rear end of the shank of the swinging jaw 6, and lies above and in rear of the longitudinal line or plane of the pivot 11, by which a seat or recess is formed upon the inner side of the lug to receive the free end of the spring arm 18, thus allowing said spring arm and the swinging jaw controlled thereby to have a comparatively wide range of movement. Furthermore, the diverging arrangement of the spring arms 18 and 19 and the form and arrangement of the lug provides a space between the free end of the spring arm 18 and the shank 1 for the arrangement of the stop pin 20, by which the outward swinging movement of the movable jaw is controlled and an undue yielding action thereof prevented.

I wish it to be understood that the fulcrum of the spring is below the fulcrum 11 of the jaw 6, it follows that the normal tendency of the spring is to exert a pressure on the shank of the jaw 3 that will hold the said shank toward the movable jaw 6.

Having thus described the invention, what is claimed as new, is:—

A wrench comprising a shank with a toothed fixed jaw having longitudinal teeth, a sleeve having teeth slidably mounted on the shank and serving to contact with the longitudinal teeth of the fixed jaw, a movable jaw pivotally mounted at its rear end upon the upper front corner of the sleeve, said movable jaw having a short arm extending below its pivotal point and provided with a curved recess, a cross-pin secured upon the upper rear corner of said sleeve, a coiled spring mounted on said pin and having diverging arms of different lengths, the shorter one of which contacts with the fixed jaw, and the longer arm being extended upwardly and having its terminal curved to contact with the curvature of the short arm of the movable jaw, and said fulcrum of said spring being arranged below the fulcrum of the movable jaw to permit of the normal tendency of the spring to exert a greater pressure on the shank of the fixed jaw, a stop pin for engaging the shank of the fixed jaw to limit the movement of the sleeve, and a stop pin for engaging the curvature of the longer arm of the spring to hold the fixed jaw in normal gripping position and also permit of a limited outward movement of the same.

In testimony whereof, I affix my signature in presence of two witnesses.

CHARLES H. FOSTER.

Witnesses:
ALBERT L. JOHNSON,
CARL J. JOHNSON.